US012608457B2

(12) United States Patent
Sato et al.

(10) Patent No.: US 12,608,457 B2
(45) Date of Patent: Apr. 21, 2026

(54) AUTHENTICATION APPARATUS, AUTHENTICATION METHOD, AND NON-TRANSITORY RECORDING MEDIUM USING BIOMETRIC INFORMATION AND KNOWLEDGE INFORMATION

(71) Applicant: NEC Corporation, Tokyo (JP)

(72) Inventors: Hirotake Sato, Tokyo (JP); Yuki Shimizu, Tokyo (JP)

(73) Assignee: NEC Corporation, Tokyo (JP)

( * ) Notice: Subject to any disclaimer, the term of this patent is extended or adjusted under 35 U.S.C. 154(b) by 1 day.

(21) Appl. No.: 18/721,963

(22) PCT Filed: Dec. 23, 2021

(86) PCT No.: PCT/JP2021/047891
§ 371 (c)(1),
(2) Date: Jun. 20, 2024

(87) PCT Pub. No.: WO2023/119560
PCT Pub. Date: Jun. 29, 2023

(65) Prior Publication Data
US 2025/0068711 A1 Feb. 27, 2025

(51) Int. Cl.
*G06F 21/00* (2013.01)
*G06F 21/32* (2013.01)
(52) U.S. Cl.
CPC .................................... *G06F 21/32* (2013.01)
(58) Field of Classification Search
CPC .............................. G06F 21/32; G06F 21/31
See application file for complete search history.

(56) References Cited

U.S. PATENT DOCUMENTS 10,405,186 B1 * 9/2019 Latsha ................. H04W 8/183
11,625,473 B2 * 4/2023 Kim ....................... G06V 40/70
726/5

(Continued)

FOREIGN PATENT DOCUMENTS

JP 2007-206739 A 8/2007
JP 2011-526028 A 9/2011

(Continued)

OTHER PUBLICATIONS

International Search Report for PCT Application No. PCT/JP2021/047891, mailed on Mar. 15, 2022.

*Primary Examiner* — William A Corum, Jr.
(74) *Attorney, Agent, or Firm* — Sughrue Mion, PLLC

(57) ABSTRACT
Provided are: performing first authentication using biometric information about an authentication target person; performing second authentication using first knowledge information indicating matters known by the authentication target person, or first possession information indicating matters had by the authentication target person; performing third authentication using second knowledge information that is different from the first knowledge information and that indicates matters known by the authentication target person, or second possession information that is different from the first possession information and that indicates matters had by the authentication target person; and performing a determination operation of determining that authentication of the target person is successful in a case where both the first authentication and the second authentication are successful, and of determining that the authentication of the target person is successful in a case where both the second authentication and the third authentication are successful even when the first authentication is not successful.

10 Claims, 12 Drawing Sheets

(56)                    References Cited

U.S. PATENT DOCUMENTS

| | | | |
|---|---|---|---|
| 2004/0039909 A1* | 2/2004 | Cheng ..................... | G07C 9/22 |
| | | | 713/169 |
| 2007/0180255 A1 | 8/2007 | Hanada et al. | |
| 2009/0258667 A1 | 10/2009 | Suzuki et al. | |
| 2009/0328196 A1 | 12/2009 | Bovee | |
| 2020/0329031 A1* | 10/2020 | Hashimoto .......... | H04W 12/33 |
| 2020/0380103 A1 | 12/2020 | Hosoda | |
| 2022/0198412 A1 | 6/2022 | Nishino et al. | |
| 2022/0277069 A1* | 9/2022 | Yokomizo .............. | G06F 21/31 |

FOREIGN PATENT DOCUMENTS

| | | | |
|---|---|---|---|
| JP | 2017-058808 A | 3/2017 |
| JP | 2020-197849 A | 12/2020 |
| JP | 2021-135975 A | 9/2021 |
| WO | 2007/119818 A1 | 10/2007 |
| WO | 2020/203381 A1 | 10/2020 |

* cited by examiner ( a )

( b )

AUTHENTICATION APPARATUS, AUTHENTICATION METHOD, AND NON-TRANSITORY RECORDING MEDIUM USING BIOMETRIC INFORMATION AND KNOWLEDGE INFORMATION

This application is a National Stage Entry of PCT/JP2021/047891 filed on Dec. 23, 2021, the contents of all of which are incorporated herein by reference, in their entirety.

TECHNICAL FIELD

This disclosure relates to technical fields of an authentication apparatus, an authentication method, and a recording medium.

BACKGROUND ART

Patent Literature 1 describes a technique/technology of: authenticating a user when a user whose authentication is approved by first authentication and a user whose authentication is approved by second authentication are the same user; and providing, when the first authentication or the second authentication are failed, an alternative authentication unit corresponding to the failed authentication. Furthermore, Patent Literature 2 describes a technique/technology of providing another log-in function corresponding to a face recognition function and a failure of face recognition. Furthermore, Patent Literature 3 describes a technique/technology of recording a time, on the basis of an authentication result of biometric authentication for identifying an authentication target person on the basis of biometric information included in authentication data including the biometric information about the authentication target person who is an authentication target. Furthermore, Patent Literature 4 describes a technique/technology of: a control unit that recognizes a target product and performs billing processing, on the basis of a product image obtained by a first camera, and performs processing about face recognition on the basis of a face image obtained by a second camera that captures an image of a user's face; and a display unit that displays billing result information and face recognition result information obtained by the control unit, wherein the control unit displays the billing result information and face recognition result information on the display unit, using a superimposed screen including at least a first screen arranged at the front and a second screen arranged at the rear.

CITATION LIST

Patent Literature

Patent Literature 1: JP2017-058808A
Patent Literature 2: JP2020-197849A
Patent Literature 3: JP2021-135975A
Patent Literature 4: International Publication No. WO2020/203381A1

SUMMARY

Technical Problem

It is an example object of this disclosure to provide an authentication apparatus, an authentication method, and a recording medium that aim to improve the techniques/technologies disclosed in Citation List.

Solution to Problem

An authentication apparatus according to an example aspect of this disclosure includes: a first authentication unit that performs first authentication using biometric information about an authentication target person; a second authentication unit that performs second authentication using first knowledge information indicating matters known by the authentication target person, or first possession information indicating matters had by the authentication target person; a third authentication unit that performs third authentication using second knowledge information that is different from the first knowledge information and that indicates matters known by the authentication target person, or second possession information that is different from the first possession information and that indicates matters had by the authentication target person; and a determination unit that performs a determination operation of determining that authentication of the authentication target person is successful in a case where both the first authentication and the second authentication are successful, and of determining that the authentication of the authentication target person is successful in a case where both the second authentication and the third authentication are successful even when the first authentication is not successful.

An authentication method according to an example aspect of this disclosure includes: performing first authentication using biometric information about an authentication target person; performing second authentication using first knowledge information indicating matters known by the authentication target person, or first possession information indicating matters had by the authentication target person; performing third authentication using second knowledge information that is different from the first knowledge information and that indicates matters known by the authentication target person, or second possession information that is different from the first possession information and that indicates matters had by the authentication target person; and performing a determination operation of determining that authentication of the authentication target person is successful in a case where both the first authentication and the second authentication are successful, and of determining that the authentication of the authentication target person is successful in a case where both the second authentication and the third authentication are successful even when the first authentication is not successful.

A recording medium according to an example aspect of this disclosure is a recording medium on which a computer program that allows a computer to execute an authentication method is recorded, the authentication method including: performing first authentication using biometric information about an authentication target person; performing second authentication using first knowledge information indicating matters known by the authentication target person, or first possession information indicating matters had by the authentication target person; performing third authentication using second knowledge information that is different from the first knowledge information and that indicates matters known by the authentication target person, or second possession information that is different from the first possession information and that indicates matters had by the authentication target person; and performing a determination operation of determining that authentication of the authentication target person is successful in a case where both the first authentication and the second authentication are successful, and of determining that the authentication of the authentication target person is successful in a case where both the second authentication and the third authentication are successful even when the first authentication is not successful.

DESCRIPTION OF EXAMPLE EMBODIMENTS

Hereinafter, an authentication apparatus, an authentication method, and a recording medium according to example embodiments will be described with reference to the drawings.

1: FIRST EXAMPLE EMBODIMENT

An authentication apparatus, an authentication method, and a recording medium according to a first example embodiment will be described. The following describes the authentication apparatus, the authentication method, and the recording medium according to the first example embodiment, by using an authentication apparatus 1000 to which the authentication apparatus, the authentication method, and the recording medium according to the first example embodiment are applied.

[1-1: Configuration of Authentication Apparatus 1000]

Figure 1:
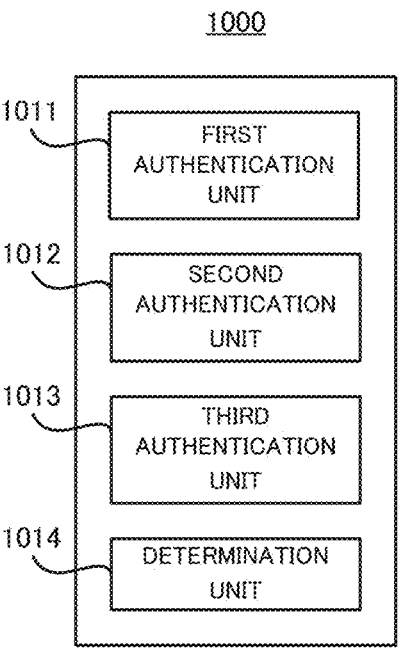
FIG. 1 is a block diagram illustrating a configuration of an authentication apparatus in a first example embodiment.

With reference to FIG. 1, a configuration of the authentication apparatus 1000 in the first example embodiment will be described. FIG. 1 is a block diagram illustrating the configuration of the authentication apparatus 1000 in the first example embodiment.

As illustrated in FIG. 1, the authentication apparatus 1000 includes a first authentication unit 1011, a second authentication unit 1012, a third authentication unit 1013, and a determination unit 1014. The first authentication unit 1011 performs first authentication using biometric information about an authentication target person. The second authentication unit 1012 performs second authentication using first knowledge information indicating matters known by the authentication target person, or first possession information indicating matters had by the authentication target person. The third authentication unit 1013 performs third authentication using second knowledge information that is different from the first knowledge information and that indicates matters known by the authentication target person, or second possession information that is different from the first possession information and that indicates matters had by the authentication target person. In a case where both the first authentication and the second authentication are successful, the determination unit 1014 determines that the authentication of the authentication target person is successful. Even when the first authentication is not successful, in a case where both the second authentication and the third authentication are successful, a determination operation of determining that the authentication of the authentication target person is successful, is performed.

[1-2: Technical Effect of Authentication Apparatus 1000]

In a case where both the first authentication and the second authentication are successful, the determination unit 1014 performs a two-factor authentication determination operation of determining that the authentication of the authentication target person is successful, and it is thus possible to improve security of the authentication. Even when the first authentication is not successful, in a case where both the second authentication and the third authentication are successful, the determination unit 1014 performs an alternative authentication determination operation of determining that the authentication of the authentication target person is successful. Since this makes it possible to authenticate the authentication target person even when the authentication target person is in a state where the first authentication is not successful, it is possible to improve convenience of the authentication.

That is, the authentication apparatus 1000 in the first example embodiment is capable of maintaining a security level and improving the convenience, simultaneously.

2: SECOND EXAMPLE EMBODIMENT

An authentication apparatus, an authentication method, and a recording medium according to a second example embodiment will be described. The following describes the authentication apparatus, the authentication method, and the recording medium according to the second example embodiment, by using an authentication system 1 including an authentication apparatus 10 to which the authentication apparatus, the authentication method, and the recording medium according to the second example embodiment are applied.

[2-1: Configuration of Authentication System 1]

Figure 2:
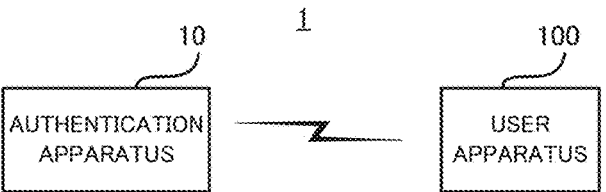
FIG. 2 is a block diagram illustrating a configuration of an authentication system in a second example embodiment.

With reference to FIG. 2, a configuration of the authentication system 1 in the second example embodiment will be described. FIG. 2 is a block diagram illustrating the configuration of the authentication system 1 in the second example embodiment.

As illustrated in FIG. 2, the authentication system 1 includes the authentication apparatus 10 and a user apparatus 100. The authentication system 1 may include a single user apparatus 100, or may include a plurality of user apparatuses 100. The user apparatus 100 may be a PC, a smartphone, a tablet terminal, or the like, had by a user who is the authentication target person. The authentication apparatus 10 and the user apparatus 100 are allowed to communicate with each other through a communications network. The communication network may include a wired communication network. The communication network may include a wireless communication network. The user may wish to access a Web service, application, or the like, through the user apparatus 100 and the authentication apparatus 10.

[2-2: Configuration of Authentication Apparatus 10]

Figure 3:
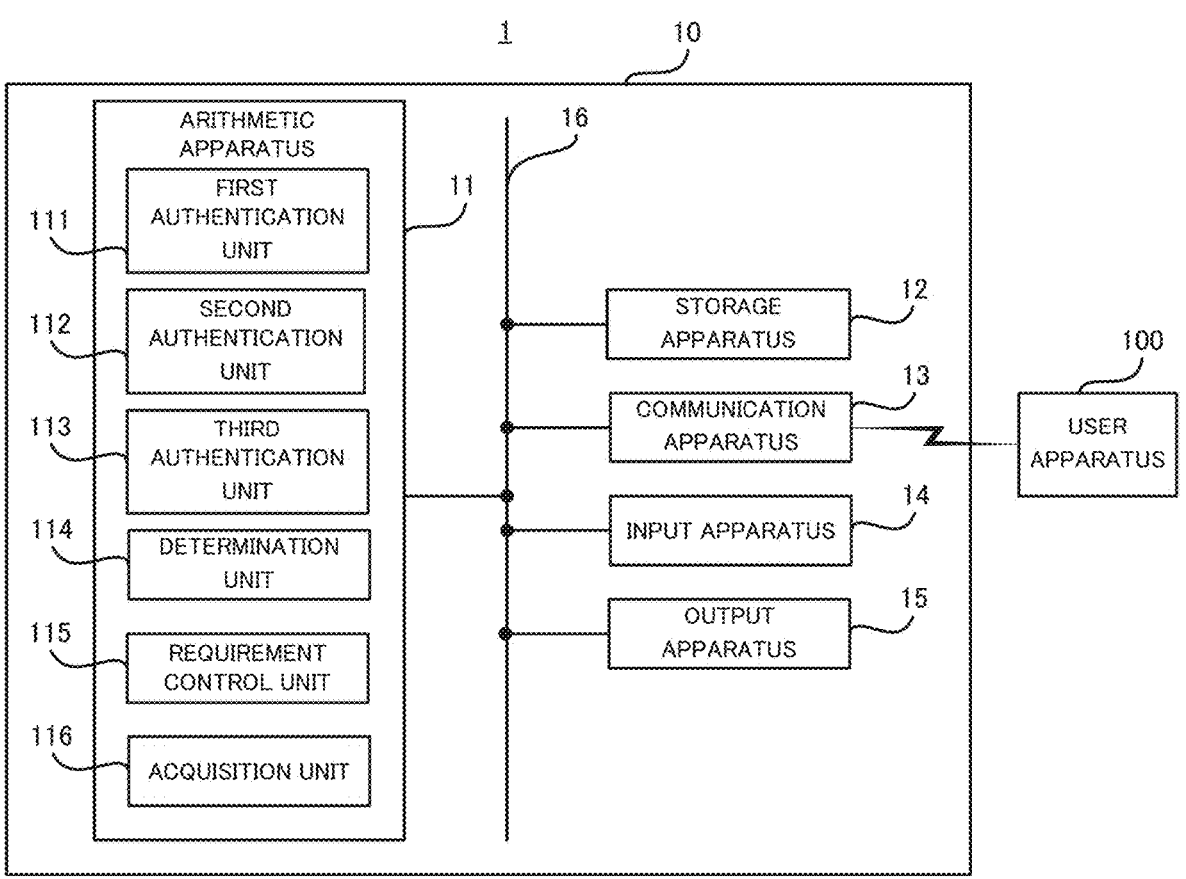
FIG. 3 is a block diagram illustrating a configuration of an authentication apparatus in the second example embodiment.

Next, with reference to FIG. 3, a configuration of the authentication apparatus 10 in the second example embodiment will be described. FIG. 3 is a block diagram illustrating the configuration of the authentication apparatus 10 in the second example embodiment.

As illustrated in FIG. 3, the authentication apparatus 10 includes an arithmetic apparatus 11 and a storage apparatus 12. Furthermore, the authentication apparatus 10 may include a communications apparatus 13, an input apparatus 14, and an output apparatus 15. The authentication apparatus 10, however, may not include at least one of the communication apparatus 13, the input apparatus 14 and the output apparatus 15. The arithmetic apparatus 11, the storage apparatus 12, the communication apparatus 13, the input apparatus 14, and the output apparatus 15 may be connected through a data bus 16.

The arithmetic apparatus 11 includes at least one of a CPU (Central Processing Unit), a GPU (Graphics Processing Unit), and a FPGA (Field Programmable Gate Array), for example. The arithmetic apparatus 11 reads a computer program. For example, the arithmetic apparatus 11 may read a computer program stored in the storage apparatus 12. For example, arithmetic apparatus 11 may read a computer program stored by a computer-readable and non-transitory recording medium, by using a not-illustrated recording medium reading apparatus provided in the authentication apparatus 10 (e.g., the input apparatus 14 described later). The arithmetic apparatus 11 may acquire (i.e., download or read) a computer program from a not-illustrated apparatus disposed outside the authentication apparatus 10, through the communication apparatus 13 (or another communication apparatus). The arithmetic apparatus 11 executes the read computer program. Consequently, a logical functional block for performing an operation to be performed by the authentication apparatus 10 is realized or implemented in the arithmetic apparatus 11. That is, the arithmetic apparatus 11 is allowed to function as a controller for realizing or implementing the logical function block for performing an operation (in other words, processing) to be performed by the authentication apparatus 10.

FIG. 3 illustrates an example of the logical functional block realized or implemented in the arithmetic apparatus 11 to perform an authentication operation. As illustrated in FIG. 3, a first authentication unit 111 that is a specific example of the "first authentication unit", a second authentication unit 112 that is a specific example of the "second authentication unit", a third authentication unit 113 that is a specific example of the "third authentication unit", a determination unit 114 that is a specific example of the "determination unit", a requirement control unit 115, and an acquisition unit 116 are realized or implemented in the arithmetic apparatus 11. At least one of the requirement control unit 115 and the acquisition unit 116 may not be realized or implemented in the arithmetic apparatus 11.

Details of operations of each of the first authentication unit 111, the second authentication unit 112, the third authentication unit 113, the determination unit 114, the requirement control unit 115, and the acquisition unit 116 will be described later with reference to FIG. 6 to FIG. 10.

The storage apparatus 12 is configured to store desired data. For example, the storage apparatus 12 may temporarily store a computer program to be executed by the arithmetic apparatus 11. The storage apparatus 12 may temporarily store data that are temporarily used by the arithmetic apparatus 11 when the arithmetic apparatus 11 executes the computer program. The storage apparatus 12 may store data that are stored by the authentication apparatus 10 for a long time. The storage apparatus 12 may include at least one of a RAM (Random Access Memory), a ROM (Read Only Memory), a hard disk apparatus, a magneto-optical disk apparatus, a SSD (Solid State Drive), and a disk array apparatus. That is, the storage apparatus 12 may include a non-transitory recording medium.

The communication apparatus 13 is configured to communicate with an apparatus external to the authentication apparatus 10 through a not-illustrated communication network. The communication apparatus 13 may acquire, from the user apparatus 100, the information used for the authentication operation through the communication network.

The input apparatus 14 is an apparatus that receives an input of information to the authentication apparatus 10 from an outside of the authentication apparatus 10. For example, the input apparatus 14 may include an operating apparatus (e.g., at least one of a keyboard, a mouse, and a touch panel) that is operable by an operator of the authentication apparatus 10. For example, the input apparatus 14 may include a reading apparatus that is configured to read information recorded as data on a recording medium that is externally attachable to the authentication apparatus 10.

The output apparatus 15 is an apparatus that outputs information to the outside of the authentication apparatus 10. For example, the output apparatus 15 may output information as an image. That is, the output apparatus 15 may include a display apparatus (a so-called display) that is configured to display an image indicating the information that is desirably outputted. For example, the output apparatus 15 may output information as audio/sound. That is, the output apparatus 15 may include an audio apparatus (a so-called speaker) that is configured to output audio/sound. For example, the output apparatus 15 may output information onto a paper surface. That is, the output apparatus 15 may include a print apparatus (a so-called printer) that is configured to print desired information on the paper surface.

Generally, multi-factor authentication that combines several factors such as knowledge information, possession information, and biometric information, is used as a method of enhancing security of access to the Web service, application, or the like. The biometric authentication may include face recognition using a face image, iris recognition using an iris image; fingerprint recognition using a fingerprint image; palmprint recognition using a palmprint image; vein recognition using a vein image of a palm or the like; and ear acoustic authentication using a sound reflected from an earhole (ear canal).

The face recognition is available in a widespread device with a camera such as a PC, a smartphone, and a tablet. On the other hand, for example, the fingerprint recognition, and authentication using an USB key, an IC card, or the like, require a dedicated apparatus. As described above, the face recognition is more convenient than the fingerprint recognition, and the authentication using an USB key, an IC card, or the like. For this reason, two-factor authentication that combines and uses the face recognition and knowledge authentication such as ID password authentication, is performed in some cases. The second example embodiment exemplifies and describes a case where the face recognition using a face image of the authentication target person is performed as the first authentication using the biometric information about the authentication target person. Furthermore, the second example embodiment exemplifies and describes a case where ID password authentication using an ID and password known by the authentication target person is performed as the second authentication using the first knowledge information indicating matters known by the authentication target person, or the first possession information indicating matters had by the authentication target person.

[2-3-1: Introduction of Alternative Authentication]

For example, let us suppose that the two-factor authentication of the face recognition and the ID password is performed as a company's security policy. In this situation, when it is temporarily hard to perform the face recognition such as when there is a failure in a camera mounted on the user apparatus 100 and when the user is wearing an eye bandage, the user's convenience is impaired. If the security policy is changed to perform authentication only with the ID password authentication, the security policy for all employees is changed, even though it is possible to perform the face recognition on the majority of authentication target persons. Since it is possible to perform the face recognition on the majority of authentication target persons, it is preferable to perform authentication using the face recognition, even for security reasons, on users other than the authentication target person for whom the face recognition is not possible. Therefore, the authentication apparatus 10 provides alternative authentication for a case where the face recognition is not possible. The authentication apparatus 10 may perform the third authentication using the second knowledge information indicating matters known by the authentication target person, or the second possession information indicating matters had by the authentication target person, on the authentication target person for whom the face recognition is failed. The second example embodiment exemplifies and describes a case of performing command matching as the third authentication. The command matching is performed in a case where the alternative authentication is allowed. An authentication procedure for the command matching may use any of PIN code authentication, pattern code authentication, SMS authentication, and the like. The authentication procedure for the command matching may be selected and set by an administrator of users at a portal site of the authentication apparatus 10.

The authentication apparatus 10 is capable of switching between enabling and disabling the two-factor authentication, and is capable of switching between enabling and disabling the alternative authentication. It is possible to switch an authentication procedure in accordance with the user's situation, thereby to improve the convenience while ensuring the security is ensured. The administrator may also set the alternative authentication to be disabled in a case where the two-factor authentication is set to be enabled to further enhance the security.

The setting of enabling or disabling the two-factor authentication may be operated in the security policy of each company, and the administrator may set the two-factor authentication to be enabled or disabled on a tenant basis. Since the alternative authentication is provided as an avoidance unit, the administrator may set the alternative authentication to be enabled or disabled on a user basis.

[2-3-2: Introduction of Dummy Authentication Operation]

For example, in the two-factor authentication in which the authentication is determined to be successful due to a success in the face recognition and a success in the ID password authentication, in a case where the two-factor authentication is ended when the face recognition is failed, the number of times of collation/verification may be reduced. Thus, a burden on the authentication target person may be reduced, but the authentication target person may be able to guess that the face recognition is failed. The authentication target person, however, may be a malicious third party (attacker). In this situation, the attacker may be able to guess in which factor the authentication is successful or failed. The attacker may be able to consider against which factor an attack is convergently delivered or measures are taken, by knowing which factor of authentication is successful or failed, and this may cause a security risk. Therefore, a dummy authentication operation is performed in the authentication apparatus 10.

The dummy authentication operation may include an operation in which the second authentication unit 112 performs the second authentication even when the first authentication is not successful, and in which the determination unit 114 determines that the authentication is failed regardless of whether the second authentication is successful or failed. Furthermore, the dummy authentication operation may include an operation in which the third authentication unit 113 performs the third authentication even when the second authentication is not successful, and in which the determination unit 114 determines that the authentication is failed regardless of whether the third authentication is successful or failed. Furthermore, the dummy authentication operation may include an operation in which the second authentication unit 112 performs the second authentication when the first authentication is not successful in a situation where a two-factor authentication function is enabled and an alternative authentication function is not enabled, and in which the determination unit 114 determines that the authentication is failed regardless of whether the second authentication is successful or failed. In addition, the dummy authentication operation may include an operation in which the third authentication unit 213 performs the third authentication when the second authentication is not successful in a situation where the alternative authentication function is enabled, and in which the determination unit 114 determines that the authentication is failed regardless of whether the third authentication is successful or failed.

As the dummy authentication operation, for example, in a case where the two-factor authentication is enabled, the authentication apparatus 10 may require dummy ID password authentication regardless of whether or not the face recognition is successful. This makes it possible to prevent the attacker from guessing which of the face recognition and the ID password authentication is failed.

[2-3-3: Consideration of Concept of Success in Authentication]

The authentication apparatus 10 in the second example embodiment performs the authentication to secure the security and to reduce the burden on the authentication target person. The authentication apparatus 10 determines that the authentication is successful in any of the following cases (1) to (3):

(1) the face recognition is successful, and the two-factor authentication is disabled;

(2) the face recognition is successful, and the ID password authentication is successful; and (3) the two-factor authentication is enabled, the alternative authentication is enabled, the ID password authentication is successful, and the command matching is successful.

That is, in a case where the two-factor authentication is set to be disabled, the authentication apparatus 10 is logged in successfully when the face recognition is successful. In a case where two-Factor authentication is set to be enabled, the authentication apparatus 10 is logged in successfully when the face recognition is successful and the ID password authentication is successful. In a case where both the two-factor authentication and the alternative authentication are set to be enabled and the face recognition is failed, the authentication apparatus 10 is logged in successfully when the ID password authentication is successful and the command matching is successful.

Figure 4:
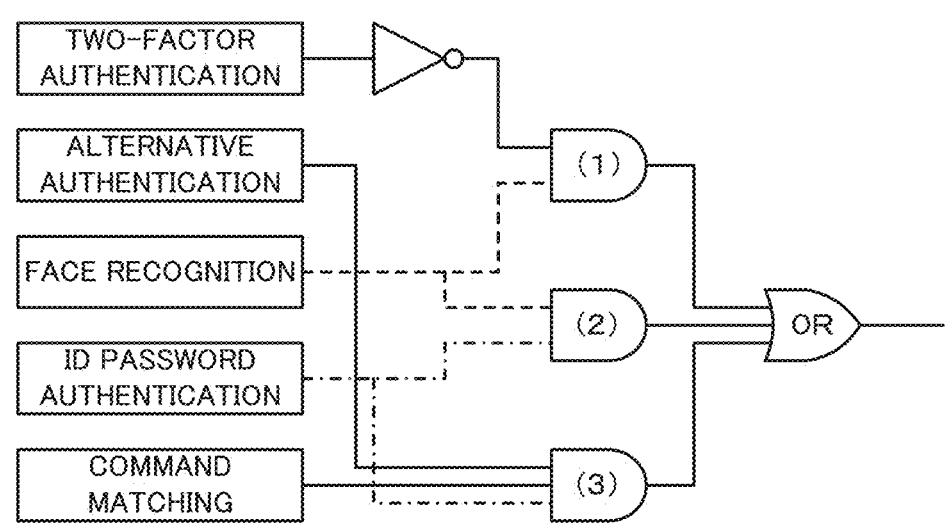
FIG. 4 illustrates a logic circuit representing an authentication operation performed by the authentication apparatus in the second example embodiment.
Figure 4:
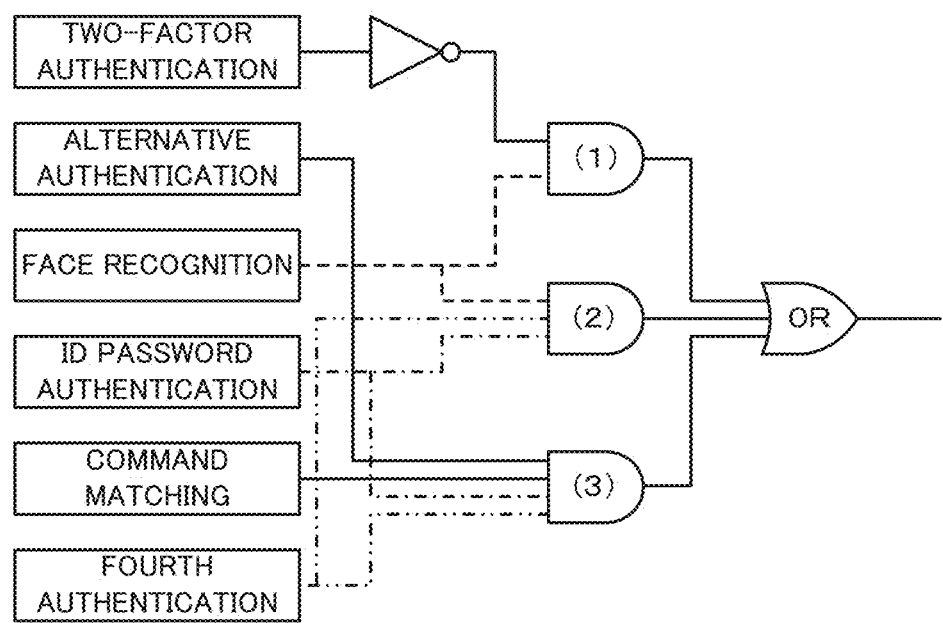

The determination performed by the authentication apparatus 10 can be represented by a logic circuit illustrated in FIG. 4(*a*). In FIG. 4(*a*), a success in the face recognition is indicated by a dashed line, a success in the ID password authentication is indicated by an alternate long and short dashed line, and the disabled two-factor authentication, the enabled alternative authentication, and a success in the command matching are indicated by a solid line. That is, the authentication apparatus 10 determines that the authentication is successful when any of the following cases is inputted to an OR circuit: a case where the success in the face recognition and the disabled two-factor authentication are inputted to an AND circuit (1); a case where the success in the face recognition and the success in the ID password authentication are inputted to an AND circuit (2); and a case where the enabled alternative authentication, the success in the ID password authentication, and the success in the command matching are inputted to an AND circuit (3).

[2-3-4: Consideration of Ordering of Authentication]

In order that the authentication apparatus 10 equally treat the cases (1), (2) and (3), the ordering of the authentication is considered as follows:

The case (3) is authentication to be performed when the face recognition cannot be successful. Furthermore, in a case where the two-factor authentication is disabled, only the success in the face recognition causes the authentication to be successful (in the case (1)). Therefore, the face recognition is performed first.

In a case where the face recognition is successful, the case (3) is unnecessary, and thus, the ID password authentication is performed second. On the other hand, when the face recognition cannot be successful, the authentication is determined to be successful in the cases (3). Therefore, whether the alternative authentication is enabled, is confirmed first, the ID password authentication is performed second, and command matching is performed third.

When the authentication operation is performed in the above order, it is possible to reduce the number of times of collation/verification, thereby reducing the burden on the authentication target person. That is, the second authentication part 112 performs the ID password authentication after the first authentication part 111 performs the face recognition. In addition, the third authentication part 113 performs the command matching after the second authentication part 112 performs the ID password authentication.

The authentication operation in the above order will be described with reference to flowcharts illustrated in FIG. 5 to FIG. 10.

Furthermore, the determination in a case where the number of factors of the multi-factor authentication is increased, for example, by employing fourth authentication, will be described with reference to FIG. 4(*b*). In FIG. 4(*b*), a success in the fourth authentication is illustrated by a two-dot chain line. In a case where the number of factors is increased, it is sufficient to increase the number of inputs to the AND circuit (2) and the AND circuit (3), as illustrated in FIG. 4(*b*), and it is possible to perform the determination using the concept of the success in the authentication and the ordering of the authentication described above.

[2-4: Screen Transition in User Apparatus 100]

Figure 5:
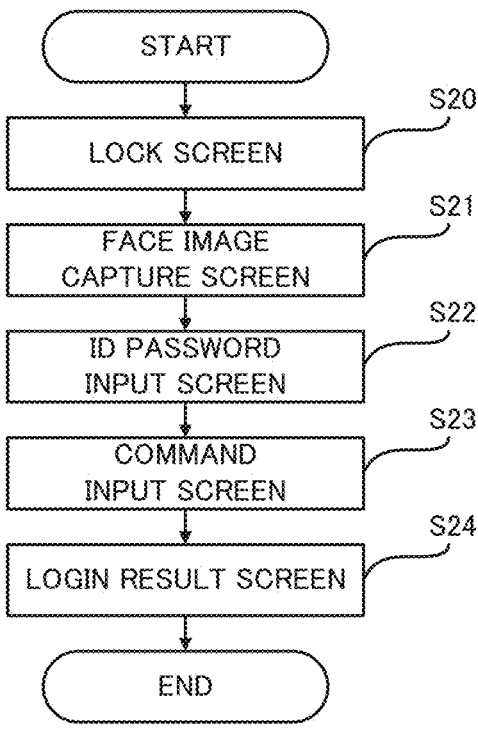
FIG. 5 is a flowchart illustrating a flow of screen transition in a user terminal.

FIG. 5 is a flowchart illustrating a flow of screen transition in the user apparatus 100. Hereinafter, a scene of first login in the user apparatus 100, such as at a start of the user apparatus 100, will be described.

In a display of the user apparatus 100, a screen is locked in a case where the display is not used by the user (step S20). When the user wants to use the user apparatus 100, the requirement control unit 115 requires the face image from the user apparatus 100, and the display of the user apparatus 100 displays a face image capture screen (step S21). The face image capture screen may be a screen displaying the face image captured by the camera mounted on the user apparatus 100, or may be a screen displaying face image used for the face recognition. Then, the requirement control unit 115 requires the ID and password from the user apparatus 100, and the display of the user apparatus 100 displays a screen for the user to input the ID and password (step S22). Subsequently, the requirement control unit 115 requires a command from the user apparatus 100, and the display of the user apparatus 100 displays a screen for the user to input the command (step S23). After these, a determination result by the determination unit 114 is received, and the display of the user apparatus 100 displays a login result (step S24). In a case where the user apparatus 100 is logged in successfully, the user apparatus 100 may be shifted into a state where it is available for the user. In a case where the login is failed, the screen may remain locked in the display of the user apparatus 100, and the user may be notified that the login is failed.

The step S22 and the step S23 may be performed as a dummy. Furthermore, the step S22 and step S23 may be omitted.

[2-5: Authentication Operation Performed by Authentication Apparatus 10]

Next, an information processing operation performed by the authentication apparatus 10 in the second example embodiment will be described with reference to FIG. 6 to FIG. 10.

Figure 6:
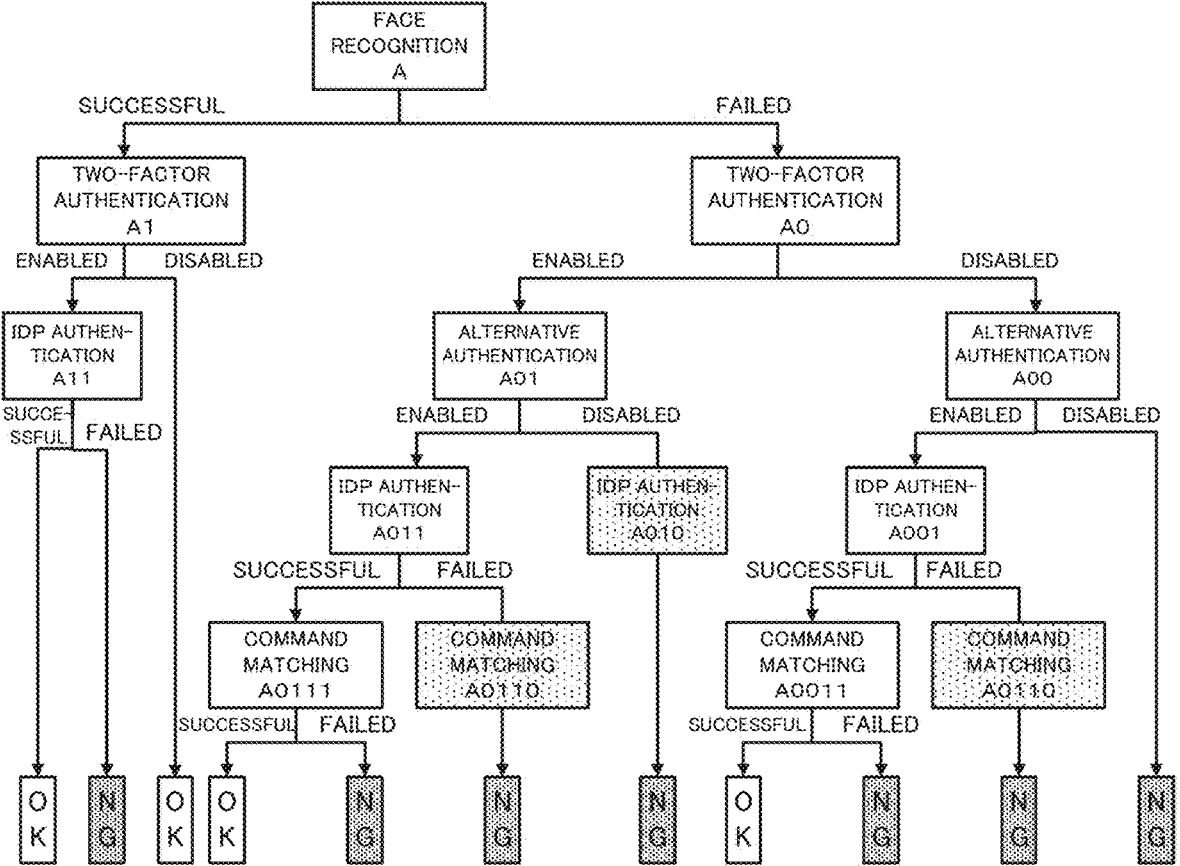
FIG. 6 is a flowchart illustrating a flow of the authentication operation performed by the authentication apparatus in the second example embodiment.

FIG. 6 is a diagram illustrating all possible flows due to the setting of the two-factor authentication and the alternative authentication. The authentication apparatus 10 in the second example embodiment is configured to arbitrarily perform the setting of enabling or disabling the two-factor authentication and the setting of enabling or disabling the alternative authentication.

Figure 7:
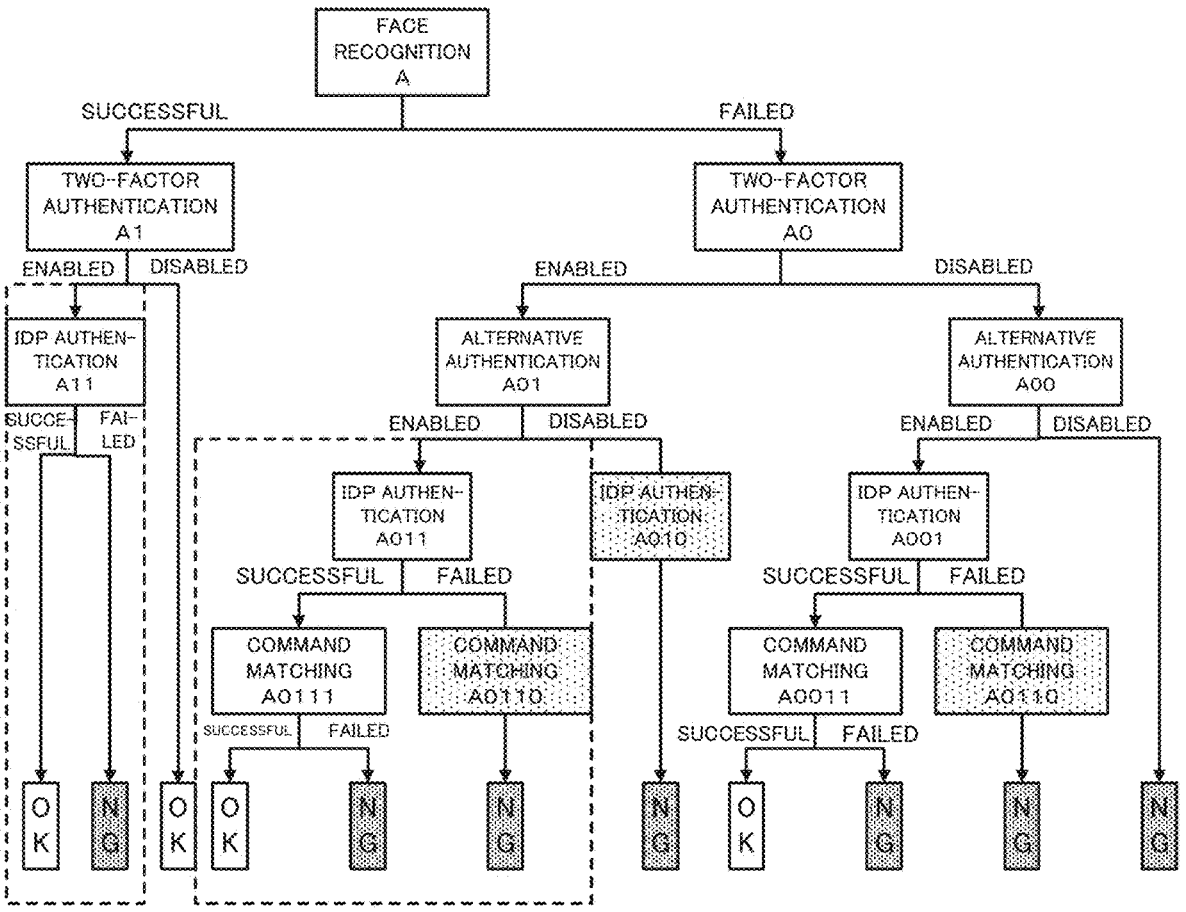
FIG. 7 is a flowchart illustrating a flow of the authentication operation performed by the authentication apparatus in the second example embodiment in a case where each of two-factor authentication and alternative authentication is set to be enabled.
Figure 8:
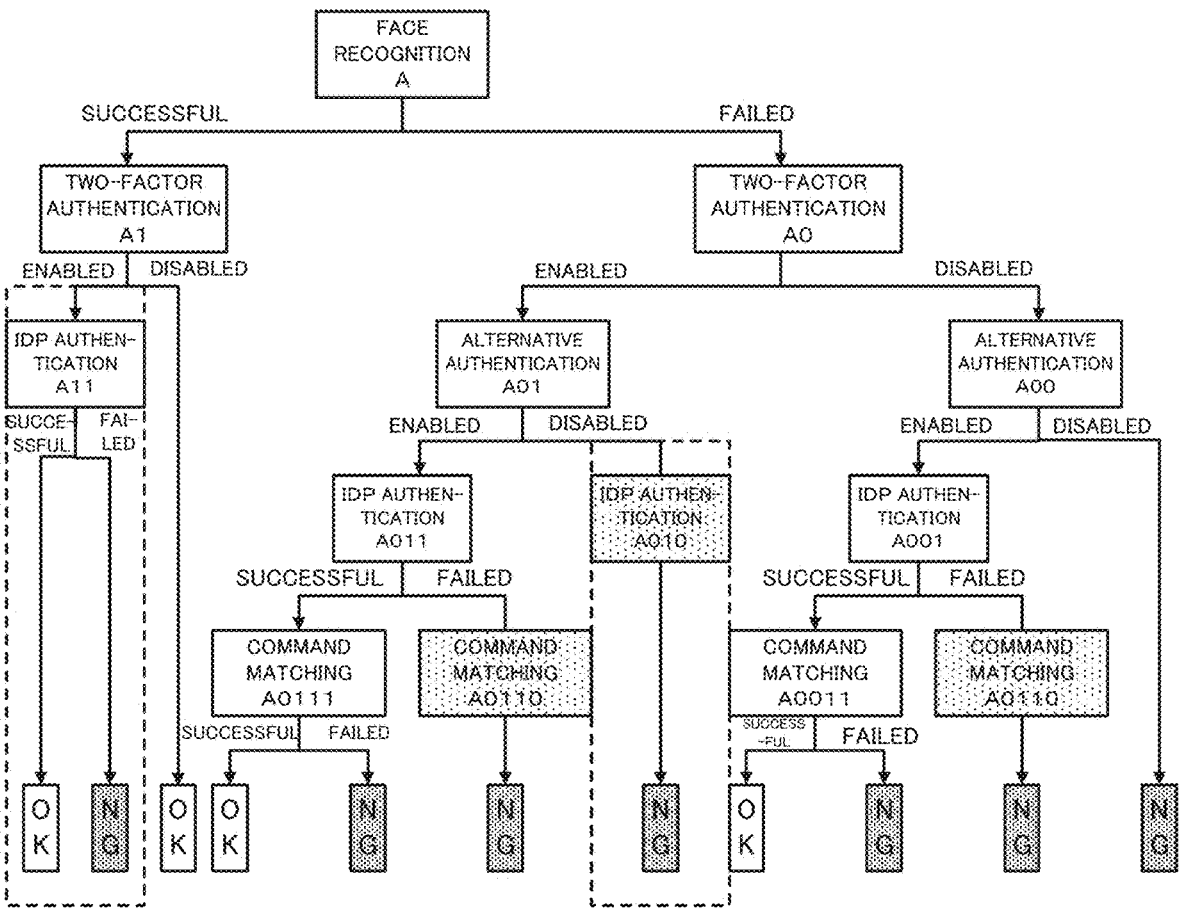
FIG. 8 is a flowchart illustrating a flow of the authentication operation performed by the authentication apparatus in the second example embodiment in a case where the two-factor authentication is set to be enabled and the alternative authentication is set to be disabled.
Figure 9:
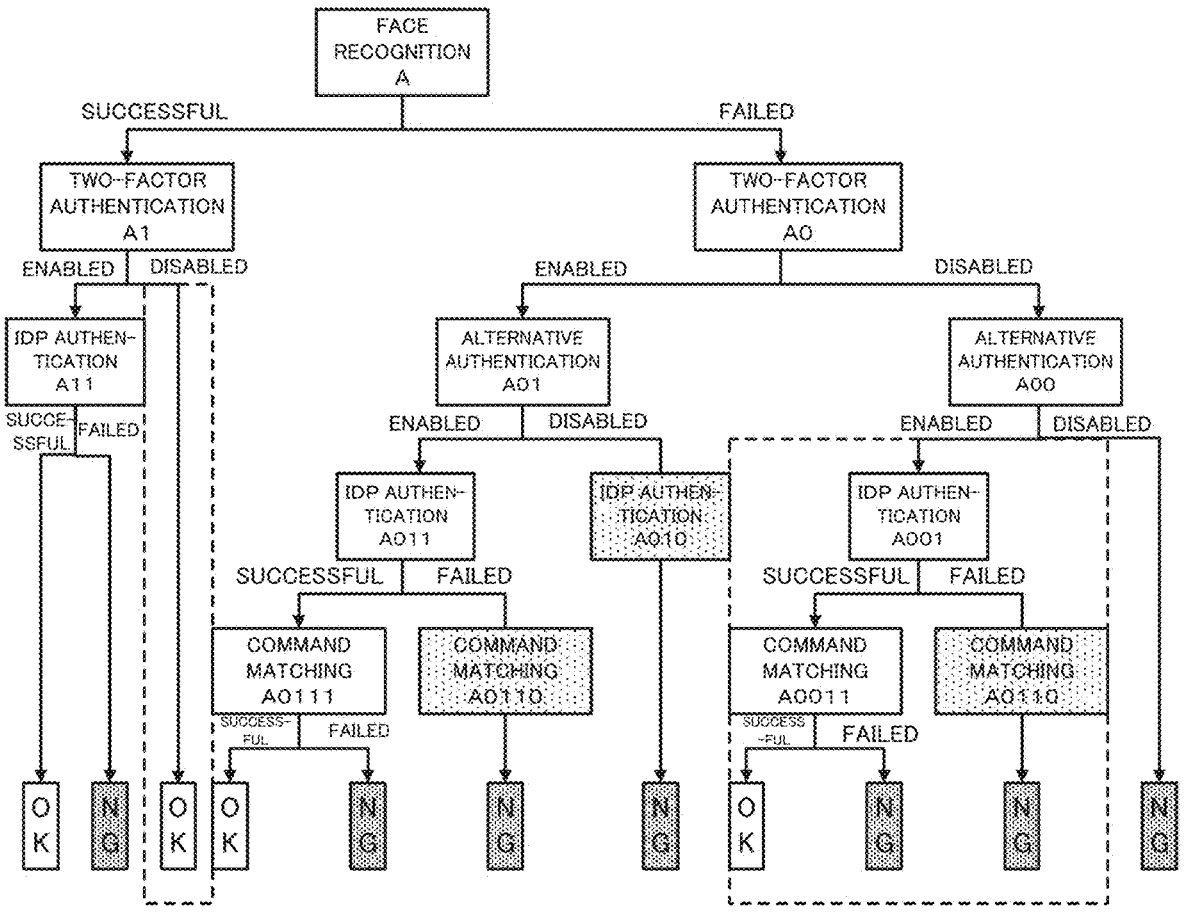
FIG. 9 is a flowchart illustrating a flow of the authentication operation performed by the authentication apparatus in the second example embodiment in a case where the two-factor authentication is set to be disabled and the alternative authentication is set to be enabled.
Figure 10:
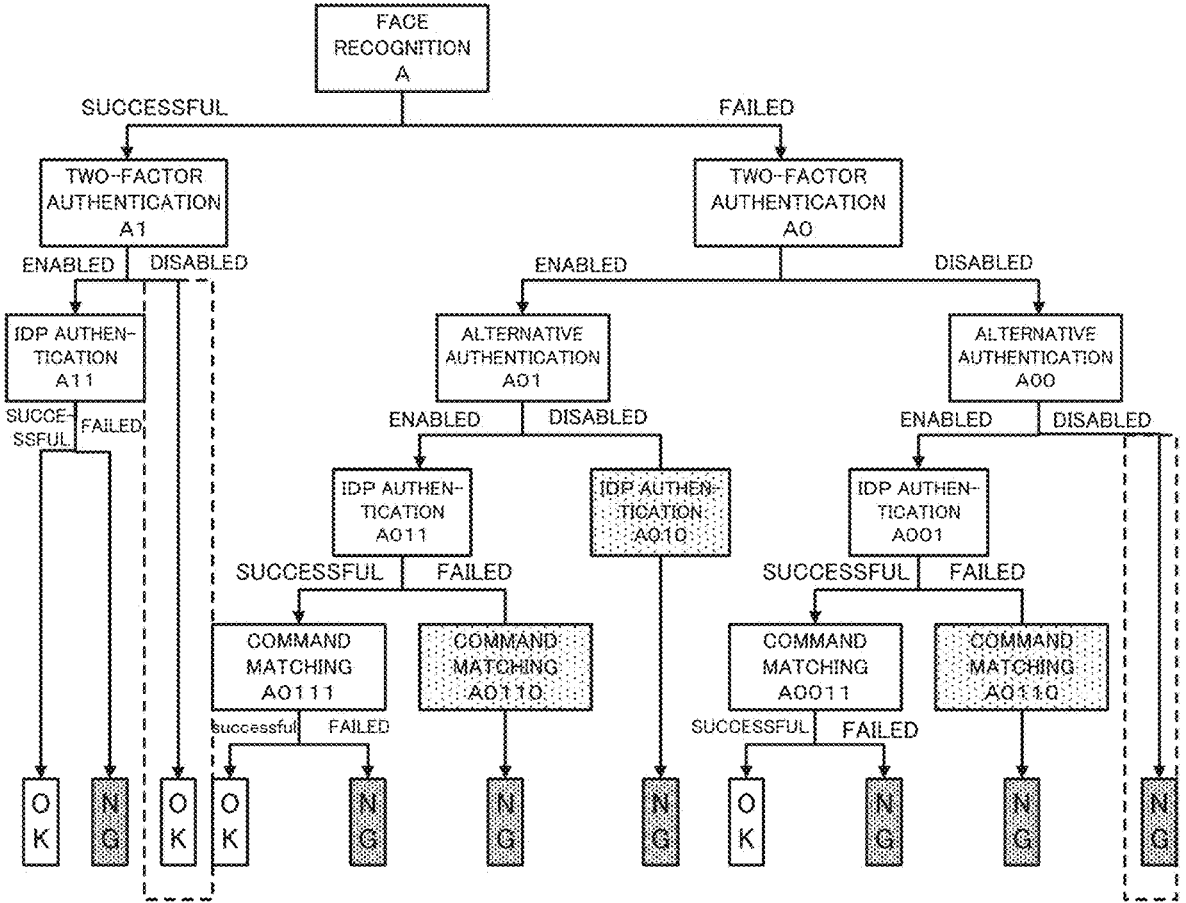
FIG. 10 is a flowchart illustrating a flow of the authentication operation performed by the authentication apparatus in the second example embodiment in a case where each of the two-factor authentication and the alternative authentication is set to be disabled.

FIG. 7 is a diagram illustrating, by a dashed line, a flow in a case where each of two-factor authentication and alternative authentication is set to be enabled. FIG. 8 is a diagram illustrating, by a dashed line, a flow in a case where the two-factor authentication is set to be enabled and the alternative authentication is set to be disabled. FIG. 9 is a diagram illustrating, by a dashed line, a flow in a case where the two-factor authentication is set to be disabled and the alternative authentication is set to be enabled. FIG. 10 is a diagram illustrating, by a dashed line, a flow in a case where each of the two-factor authentication and the alternative authentication is set to be disabled.

With reference to FIG. 7, the flow of the authentication operation performed by the authentication apparatus 10 in the second example embodiment in a case where each of the two-factor authentication and the alternative authentication is set to be enabled, will be described.

First, the requirement control unit 115 requires the face image from the user apparatus 100, the acquisition unit 116 acquires the face image from the user apparatus 100, and the first authentication unit 111 performs the face recognition (step A).

When the face recognition is successful (the step A: successful), the requirement control unit 115 requires the ID and password from the user apparatus 100, the acquisition unit 116 acquires the ID and password from the user apparatus 100, and the second authentication unit 112 performs the ID password authentication (step A11).

When the ID password authentication is successful (the step A11: successful), the determination unit 114 determines that the authentication of the authentication target person is successful. When the ID password authentication is failed (the step A11: failed), the determination unit 114 determines that the authentication of the authentication target person is failed.

When the face recognition is failed (the step A: failed), the requirement control unit 115 requires the ID and password from the user apparatus 100, the acquisition unit 116 acquires the ID and password from the user apparatus 100, and the second authentication unit 112 performs the ID password authentication (step A011).

When the ID password authentication is successful (the step A011: successful), the requirement control unit 115 requires the command from the user apparatus 100, the acquisition unit 116 acquires the command from the user apparatus 100, and the third authentication unit 113 performs the command matching (step A0111).

When the command matching is successful (the step A0111: successful), the determination unit 114 determines that the authentication of the authentication target person is successful. When the command matching is failed (the step A0111: failed), the determination unit 114 determines that the authentication of the authentication target person is failed. That is, in a case where the two-factor authentication and the alternative authentication are enabled, where the face recognition is failed, and where the ID password authentication is successful, the authentication is successful when the command matching is successful.

When the ID password authentication is failed (the step A011: failed), the third authentication unit 113 performs dummy command matching (step A0110). The third authentication unit 113 performs the command matching as a dummy even when the ID password authentication is not successful. The dummy command matching may be an operation in which the authentication target person is required to input the command under the control of the requirement control unit 115, while it is determined that the command matching is failed regardless of the content of the command inputted by the authentication target person. Whether or not the acquisition unit 116 performs an acquisition operation of acquiring the command inputted by the authentication target person, and whether or not the third authentication unit 113 performs a command matching operation, may be arbitrary. When the ID password authentication is failed (the step A011: failed), the determination unit 114 determines that the authentication of the authentication target person is failed. Although the determination unit 114 determines that the authentication of the authentication target person is failed when the ID password authentication is failed, the third authentication unit 113 performs the dummy command matching, and it is thus possible to prevent the attacker from guessing which of the ID password authentication and the command matching is failed.

As described above, the determination unit 114 determines that the authentication of the authentication target person is successful when both the face recognition and the ID password authentication are successful in a situation where the two-factor authentication function is enabled, and the determination unit 114 determines that the authentication of the authentication target person is successful even if the face recognition is not successful, when both the ID password authentication and the command matching are successful in a situation where the alternative authentication function is enabled.

In addition, the authentication unit 113 performs the command matching as a dummy when the ID password authentication is not successful in a situation where the alternative authentication function is enabled.

With reference to FIG. 8, the flow of the authentication operation performed by the authentication apparatus 10 in the second example embodiment in a case where the two-factor authentication is enabled and the alternative authentication is disabled, will be described.

First, the requirement control unit 115 requires the face image from the user apparatus 100, the acquisition unit 116 acquires the face image from the user apparatus 100, and the first authentication unit 111 performs the face recognition (step A).

When the face recognition is successful (the step A: successful), the requirement control unit 115 requires the ID and password from the user apparatus 100, the acquisition unit 116 acquires the ID and password from the user apparatus 100, and the second authentication unit 112 performs the ID password authentication (step A11).

When the ID password authentication is successful (the step A11: successful), the determination unit 114 determines that the authentication of the authentication target person is successful. When the ID password authentication is failed (the step A11: failed), the determination unit 114 determines that the authentication of the authentication target person is failed.

When the face recognition is failed (the step A: failed), the second authentication unit 112 performs the dummy ID password authentication (step A010). The second authentication unit 112 performs the ID password authentication as a dummy even when the face recognition is not successful. The dummy ID password authentication may be an operation in which the authentication target person is required to input the ID and password under the control of the requirement control unit 115, while it is determined that the ID password authentication is failed regardless of the content of the ID and password inputted by the authentication target person. Whether or not the acquisition unit 116 performs an acquisition operation of acquiring the ID and password inputted by the authentication target person, and whether or not the third authentication unit 113 performs an ID password authentication operation, may be arbitrary. When the face recognition is failed (the step A: failed), the determination unit 114 determines that the authentication of the authentication target person is failed. Although the determination unit 114 determines that the authentication of the authentication target person is failed when the face recognition is failed, the second authentication unit 112 performs the dummy ID password authentication, and it is thus possible to prevent the attacker from guessing which of the face recognition and the ID password authentication is failed. That is, in a case where the two-factor authentication is enabled, the ID password authentication is required regardless of whether or not the face recognition is successful, and in a case where the authentication is failed, the attacker is prevented from guessing which of the face recognition and the ID password authentication is incorrect.

As described above, the second authentication unit 112 performs the ID password authentication as a dummy when the face recognition is not successful in a situation where the two-factor authentication function is enabled and the alternative authentication function is not enabled.

With reference to FIG. 9, the flow of the authentication operation performed by the authentication apparatus 10 in the second example embodiment in a case where the two-factor authentication is disabled and the alternative authentication is enabled, will be described.

First, the requirement control unit 115 requires the face image from the user apparatus 100, the acquisition unit 116 acquires the face image from the user apparatus 100, and the first authentication unit 111 performs the face recognition (step A). When the face recognition is successful (the step A: successful), the determination unit 114 determines that the authentication of the authentication target person is successful.

When the face recognition is failed (the step A: failed), the requirement control unit 115 requires the ID and password from the user apparatus 100, the acquisition unit 116 acquires the ID and password from the user apparatus 100, and the second authentication unit 112 performs the ID password authentication (step A001). That is, when the face recognition is failed, and in a case where the alternative authentication is enabled even though the two-factor authentication is disabled, the ID password authentication is performed.

When the ID password authentication is successful (the step A001: successful), the requirement control unit 115 requires the command from the user apparatus 100, the acquisition unit 116 acquires the command from the user apparatus 100, and the third authentication unit 113 performs the command matching (step A0011).

When the command matching is successful (the step A0011: successful), the determination unit 114 determines that the authentication of the authentication target person is successful. When the command matching is failed (the step A0011: failed), the determination unit 114 determines that the authentication of the authentication target person is failed.

When the ID password authentication is failed (step A001: failed), the third authentication unit 113 performs the dummy command matching (step A0010). The authentication unit 113 performs the command matching as a dummy even when the ID password authentication is not successful. When the ID password authentication is failed (the step A001: failed), the determination unit 114 determines that the authentication of the authentication target person is failed.

The operation in the step A0010 may be the same as/similar to the operation in the step A0110 described above.

As described above, the authentication unit 113 performs the command matching as a dummy when the ID password authentication is not successful in a situation where the alternative authentication function is enabled.

With reference to FIG. 10, the flow of the authentication operation performed by the authentication apparatus 10 in the second example embodiment in a case where each of the two-factor authentication and the alternative authentication are disabled, will be described.

As illustrated in FIG. 10, the requirement control unit 115 requires the face image from the user apparatus 100, the acquisition unit 116 acquires the face image from the user apparatus 100, and the first authentication unit 111 performs the face recognition (step A). When the face recognition is successful (the step A: successful), the determination unit 114 determines that the authentication of the authentication target person is successful. When the face recognition is failed (the step A: failed), the determination unit 114 determines that the authentication of the authentication target person is failed. That is, in a case where each of the two-factor authentication and the alternative authentication is set to be disabled, the determination unit 114 determines that the authentication is successful or failed, only by the operation of the face recognition.

[2-6: Changing Authentication Frequency]

When the determination section 114 determines that the authentication of the authentication target person is successful, the authentication apparatus 10 may change the authentication procedure after the determination, in response to a success or failure in each of the face recognition, the ID password authentication, and the command matching. Changing the authentication procedure may include changing frequency of obtaining the authentication, changing the authentication to be performed, or the like.

For example, let us suppose that in a situation where the face recognition is set as primary authentication, it is determined that the authentication of the authentication target person is successful when the face recognition is not successful, but both the ID password authentication and the command matching are successful. In this case, since the face recognition, which is the primary authentication, is not successful, the frequency of obtaining the authentication may be increased, as compared with a case where the face recognition is successful.

For example, let us suppose that the first authentication unit 111 determines that the face recognition is successful when a degree of similarity between a feature quantity of the face image and a feature quantity for matching registered in advance, is higher than a threshold. In this case, the first authentication unit 111 may increase the threshold in a case where the degree of similarity is slightly higher than the threshold. That is, the first authentication unit 111 may perform changing such that it is severe to obtain the success in the face recognition by the first authentication unit 111, by increasing the threshold.

Alternatively, the authentication apparatus 10 may increase the frequency of requiring the authentication of the authentication target person. For example, let us suppose that in a case where a user realizes office environment processing in an environment other than an office, such as a remote work, the user does not perform an operation for a predetermined time, and when performing the operation again, the user is required to perform the authentication. In this case, when the degree of similarity is slightly higher than the threshold, the first authentication unit 111 may set the predetermined time to be shorter and increase the frequency of requiring the authentication.

Furthermore, an authenticated person who fails in the face recognition, often does not succeed in the face recognition even in the authentication that is shortly after the failure. For this reason, in the next authentication shortly after the failure in the face recognition, the face recognition may not be required, but the ID password authentication and the command matching may be required. In addition, the face recognition may be required after a lapse of the predetermined time from the failure in the face recognition.

The authentication procedure may be changed in a scene of first login in the user apparatus 100, such as at a start of the user apparatus 100, in a scene that the user apparatus 100 is in use, in a scene that the authenticated person who uses the user apparatus 100 leaves a desk, in a scene of re-login in the user apparatus 100, or the like.

The scene of first login in the user apparatus 100, such as at the start of the user apparatus 100, is as described above.

In the scene that the user apparatus 100 is in use, the frequency of requiring the authentication described above may be changed. For example, in a case where the authenticated person fails in the command matching, the frequency of requiring the face recognition may be increased.

In the scene that the authenticated person who uses the user apparatus 100 leaves a desk, the user apparatus 100 may perform face detection or person detection, and may be logged off when a face or a person is not detected.

In the scene of re-login in the user apparatus 100, when the face or the person is detected, a login screen may be outputted. The authentication to be performed may be changed by the authentication that is successful or failed in the scene of first login. For example, the authentication person who fails in the face recognition, often does not succeed in the face recognition even in the authentication that is shortly after the failure. For this reason, in a case where the face recognition is failed in the scene of first login, in the scene of re-login, the face recognition may not be required, but the ID password authentication and the command matching may be required.

[2-7: Technical Effect of Authentication Apparatus 10]

Since the second authentication unit 112 performs the second authentication as a dummy even when the first authentication is not successful, it is possible to prevent the estimation of the fact that the first authentication is not successful. Especially, by the second authentication part 112 performing the second authentication as a dummy when the first authentication is failed in a situation where the two-factor authentication function is enabled and the alternative authentication function is not enabled, it is possible to improve the security of the authentication.

Furthermore, since the third authentication unit 113 performs the third authentication as a dummy even when the second authentication is not successful, it is possible to prevent the estimation of the fact that the second authentication is not successful. Especially, by the authentication unit 113 performing the third authentication as a dummy when the second authentication is not successful in a situation where the alternative authentication function is enabled, it is possible to improve the security of the authentication.

In addition, the second authentication unit 112 performs the second authentication after the first authentication unit 111 performs the first authentication, and the third authentication unit 113 performs the third authentication after the second authentication unit 112 performs the second authentication. Therefore, in any case where each of the two-factor authentication and the alternative authentication is set to be enabled or disabled, it is possible to reduce an operation load without performing unnecessary operation, thereby improving the convenience of the authentication.

Especially the determination unit 114 determines that the authentication of the authentication target person is successful when both the first authentication and the second authentication are successful in a situation where the two-factor authentication function is enabled, and the determination unit 114 determines that the authentication of the authentication target person is successful even if the first authentication is not successful, when both the second authentication and the third authentication are successful in a situation where the alternative authentication is enabled. Therefore, the authentication apparatus 10 in the second example embodiment is capable of realizing both maintaining the security level and improving the convenience at the same time.

3: THIRD EXAMPLE EMBODIMENT

Next, an authentication apparatus, an authentication method, and a recording medium according to a third example embodiment will be described. The following describes the authentication apparatus, the authentication method, and the recording medium according to the third example embodiment, by using an authentication system 2 including an authentication apparatus 20 to which the authentication apparatus, the authentication method, and the recording medium according to the third example embodiment are applied.

[3-1: Configuration of Authentication System 2]

The authentication system 2 in the third example embodiment may have the same configuration as that of the authentication system 1 in the first example embodiment. Specifically, in the third example embodiment, the determination unit 114 performs the determination operation by using results of the first to third authentication, after the first authentication unit 111 performs the first authentication, the second authentication unit 112 performs the second authentication, and the third authentication unit 113 performs the third authentication. That is, the authentication system 2 in the third example embodiment may perform the dummy authentication more than the authentication system 1 in the second example embodiment does.

[3-2: Authentication Operation Performed By Authentication Apparatus 20]

Figure 11:
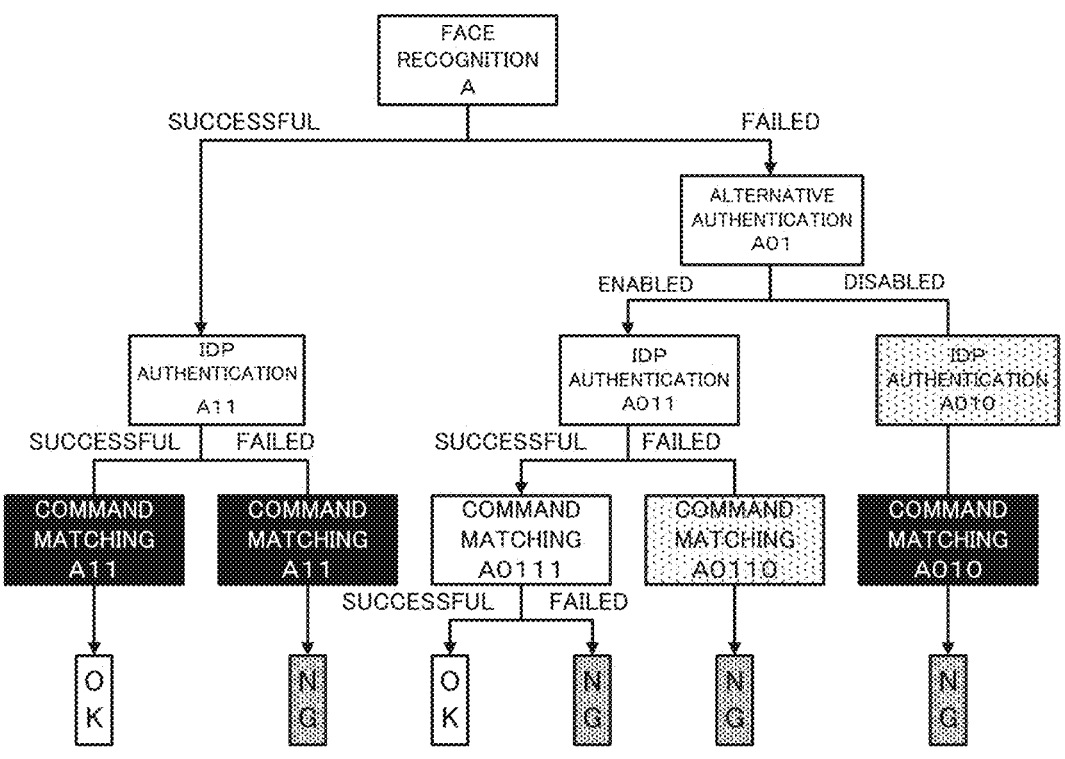
FIG. 11 is a flowchart illustrating a flow of the authentication operation performed by an authentication apparatus in a third example embodiment in a case where the two-factor authentication is set to be enabled.
Figure 12:
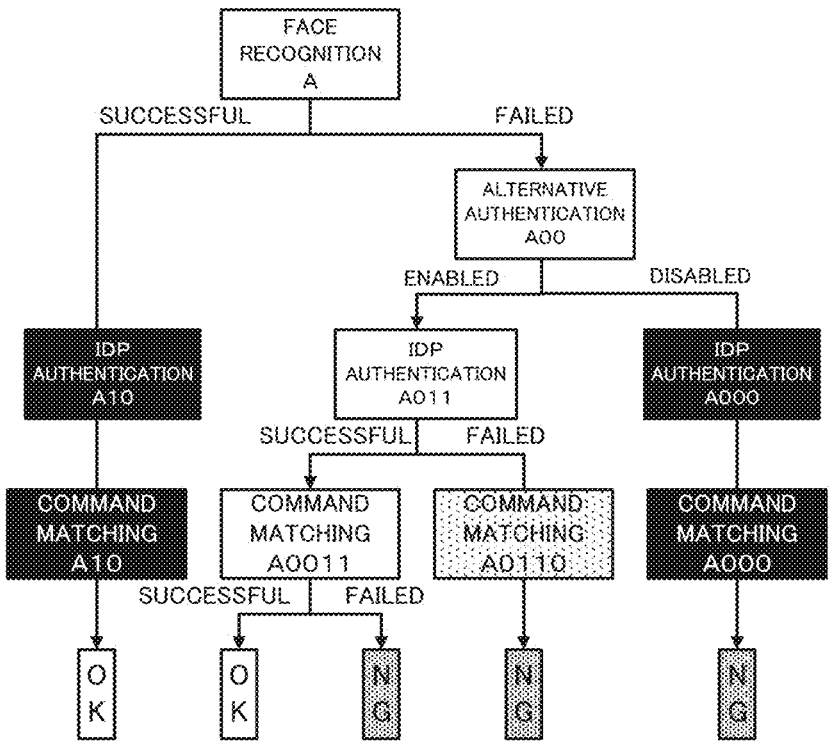
FIG. 12 is a flowchart illustrating a flow of the authentication operation performed by the authentication apparatus in the third example embodiment in a case where the two-factor authentication is set to be disabled.

Next, the information processing operation performed by the authentication apparatus 20 in the third example embodiment will be described with reference to FIG. 11 and FIG. 12. FIG. 11 is a diagram illustrating a flow in a case where the two-factor authentication is set to be enabled. FIG. 12 is a diagram illustrating a flow in a case where the two-factor authentication is set to be disabled.

In FIG. 11 and FIG. 12, steps of the dummy authentication performed by the authentication apparatus 20 in the third example embodiment more than the authentication apparatus 10 in the second example embodiment does, are painted in black and include white letters. That is, in a case where the two-factor authentication illustrated in FIG. 11 is enabled, the authentication apparatus 20 performs the command matching (step A11, step A0110, or step A010) regardless of the result of the face recognition in the step A, the determination of whether the alternative authentication is enabled or disabled in the step A01, and the result of the ID password authentication in the step A11 and the step A011. In a case where the two-factor authentication illustrated in

17

FIG. 12 is disabled, the authentication apparatus 20 performs the ID password authentication (step A10 or step A000) and the command matching (step A10 or step A000) regardless of the result of the face recognition in the step A and the setting of whether the alternative authentication is enabled or disabled in the step A00.

That is, the authentication apparatus 20 in the third example embodiment performs three-step authentication regardless of the setting of the two-factor authentication and the alternative authentication and the result of the authentication performed at a previous step. More precisely, the authentication apparatus 20 operates such that the authentication target person recognizes that the authentication is performed. That is, either the authentication whose result is used for the determination in the final authentication, or the dummy authentication is performed in accordance with the result of the authentication performed at the previous step.

[3-3: Technical Effect of Authentication Apparatus 20]

The determination unit 114 performs the determination operation by using the results of the first to third authentication, after the first authentication unit 111 performs the first authentication, the second authentication unit 112 performs the second authentication, and the third authentication unit 113 performs the third authentication. Thus, the authentication apparatus 20 in the third example embodiment is capable of making it hard to estimate which authentication is successful or failed, thereby improving the security.

4: FOURTH EXAMPLE EMBODIMENT

Next, an authentication apparatus, an authentication method, and a recording medium according to a fourth example embodiment will be described. The following describes the authentication apparatus, the authentication method, and the recording medium according to the fourth example embodiment, by using an authentication system 3 including an authentication apparatus 30 to which the authentication apparatus, the authentication method, and the recording medium according to the fourth example embodiment are applied.

[4-1: Configuration of Authentication System 3]

The authentication system 3 in the fourth example embodiment may have the same configuration as that of the authentication system 1 in the second example embodiment. In a case where the two-factor authentication (or multi-factor authentication) is used in conjunction with the alternative authentication, the number of times of collation/verification is increased, and thus, the burden on the authentication target person may be increased in some cases. Therefore, the authentication system 3 in the fourth example embodiment may not need to perform the dummy authentication, as compared with the authentication system 1 in the second example embodiment.

[4-2: Authentication Operation Performed By Authentication Apparatus 30]

Next, with reference to FIG. 13, the authentication operation performed by authentication apparatus 30 in the fourth example embodiment will be described.

In the fourth example embodiment, the determination unit 114 determines that the authentication of authentication target person is successful when both the first authentication and the second authentication are successful in a situation where the two-factor authentication function is enabled, and the determination unit 114 determines that the authentication of authentication target person is successful even if the first authentication is not successful, when both the second authentication and the third authentication are successful in a situation where the alternative authentication function is enabled. The second authentication unit 112 does not perform the second authentication when the first authentication is successful in a situation where the two-factor authentication function is not enabled, or when the first authentication is not successful in a situation where the alternative authentication functionality is not enabled. The authentication unit 113 does not perform the third authentication when the first authentication is successful, when the first authentication and the second authentication are not successful, or when the alternative authentication function is not enabled.

Figure 13:
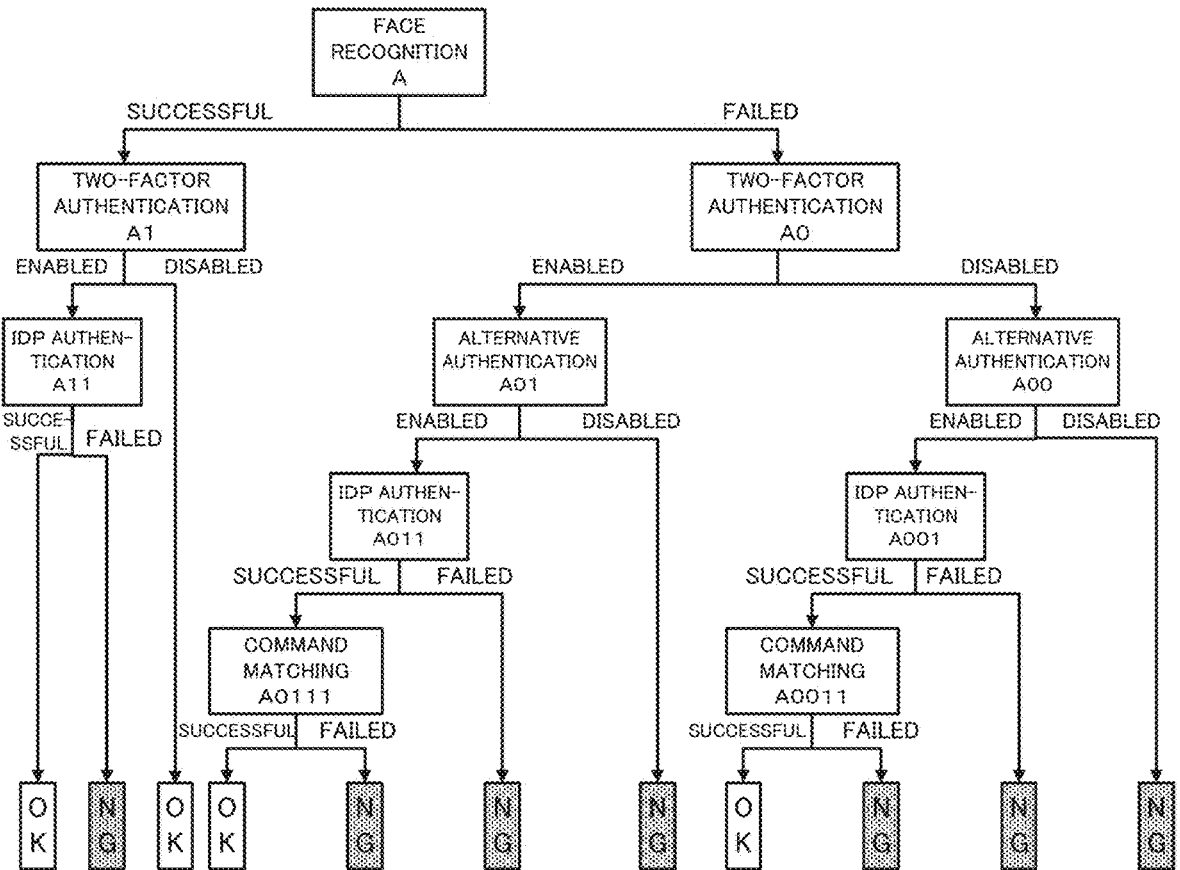
FIG. 13 is a flowchart illustrating a flow of the authentication operation performed by an authentication apparatus in a fourth example embodiment.

In comparison between FIG. 13 and FIG. 6, the authentication apparatus 30 in the fourth example embodiment does not perform the step A110, the step A010, and the step A0110, as compared with the authentication apparatus 10 in the second example embodiment. That is, in a case where the two-factor authentication illustrated in FIG. 13 is set to be enabled, the authentication apparatus 20 does not perform the dummy authentication in accordance with the determination of whether the alternative authentication is enabled or disabled in the step A01 and the step A00, and the results of the ID password authentication in the step A011 and the step A001.

[4-3: Technical Effect of Authentication Apparatus 30]

Since the authentication apparatus 30 in the fourth example embodiment does not perform the dummy authentication, it is possible to improve the convenience of the user.

5: SUPPLEMENTARY NOTES

With respect to the example embodiments described above, the following Supplementary Notes are further disclosed.

Supplementary Note 1

An authentication apparatus including:

a first authentication unit that performs first authentication using biometric information about an authentication target person;

a second authentication unit that performs second authentication using first knowledge information indicating matters known by the authentication target person, or first possession information indicating matters had by the authentication target person;

a third authentication unit that performs third authentication using second knowledge information that is different from the first knowledge information and that indicates matters known by the authentication target person, or second possession information that is different from the first possession information and that indicates matters had by the authentication target person; and a determination unit that performs a determination operation of determining that authentication of the authentication target person is successful in a case where both the first authentication and the second authentication are successful, and of determining that the authentication of the authentication target person is successful in a case where both the second authentication and the third authentication are successful even when the first authentication is not successful.

Supplementary Note 2

The authentication apparatus according to Supplementary Note 1, wherein the second authentication unit performs the second authentication even when the first authentication is not successful, and the determination unit determines that the authentication is failed regardless of whether the second authentication is successful or failed.

Supplementary Note 3

The authentication apparatus according to Supplementary Note 1 or 2, wherein the third authentication unit performs the third authentication even when the second authentication is not successful, and the determination unit determines that the authentication is failed regardless of whether the third authentication is successful or failed.

Supplementary Note 4

The authentication apparatus according to any one of Supplementary Notes 1 to 3, wherein the determination unit determines that the authentication of the authentication target person is successful when both the first authentication and the second authentication are successful in a situation where a two-factor authentication function is enabled, and determines that the authentication of the authentication target person is successful even if the first authentication is not successful, when both the second authentication and the third authentication are successful in a situation where an alternative authentication function is enabled, the second authentication unit performs the second authentication when the first authentication is not successful in a situation where the two-factor authentication function is enabled and the alternative authentication function is not enabled, and the determination unit determines that the authentication is failed regardless of whether the second authentication is successful or is failed, and the third authentication unit performs the third authentication when the second authentication is not successful in a situation where the alternative authentication function is enabled, and the determination unit determines that the authentication is failed regardless of whether the third authentication is successful or failed.

Supplementary Note 5

The authentication apparatus according to any one of Supplementary Notes 1 to 4, wherein the determination unit determines that the authentication of the authentication target person is successful when both the first authentication and the second authentication are successful in a situation where a two-factor authentication function is enabled, and determines that the authentication of the authentication target person is successful even if the first authentication is not successful, when both the second authentication and the third authentication are successful in a situation where an alternative authentication function is enabled, the second authentication unit does not perform the second authentication when the first authentication is successful in a situation where the two-factor authentication function is not enabled, or when the first authentication is not successful in a situation where the alternative authentication function is not enabled, and the third authentication unit does not perform the third authentication when the first authentication is successful, when the first authentication and the second authentication are not successful, or when the alternative authentication function is not enabled.

Supplementary Note 6

The authentication apparatus according to any one of Supplementary Notes 1 to 5, wherein the determination unit performs the determination operation by using results of the first to third authentication, after the first authentication unit performs the first authentication, the second authentication unit performs the second authentication, and the third authentication unit performs the third authentication.

Supplementary Note 7

The authentication apparatus according to any one of Supplementary Notes 1 to 6, wherein the second authentication unit performs the second authentication after the first authentication unit performs the first authentication, and the third authentication unit performs the third authentication after the second authentication unit performs the second authentication.

Supplementary Note 8

The authentication apparatus according to any one of Supplementary Notes 1 to 7, wherein in a case where the determination unit determines that the authentication of the authentication target person is successful, a procedure of authentication after the determination is changed in accordance with a success or a failure in each of the first authentication, the second authentication, and the third authentication.

Supplementary Note 9

An authentication method including:

performing first authentication using biometric information about an authentication target person;

performing second authentication using first knowledge information indicating matters known by the authentication target person, or first possession information indicating matters had by the authentication target person;

performing third authentication using second knowledge information that is different from the first knowledge information and that indicates matters known by the authentication target person, or second possession information that is different from the first possession information and that indicates matters had by the authentication target person; and performing a determination operation of determining that authentication of the authentication target person is successful in a case where both the first authentication and the second authentication are successful, and of determining that the authentication of the authentication target person is successful in a case where both the second authentication and the third authentication are successful even when the first authentication is not successful.

Supplementary Note 10

A recording medium on which a computer program that allows a computer to execute an authentication method is recorded, the authentication method including:

performing first authentication using biometric information about an authentication target person;

performing second authentication using first knowledge information indicating matters known by the authentication target person, or first possession information indicating matters had by the authentication target person;

performing third authentication using second knowledge information that is different from the first knowledge information and that indicates matters known by the authentication target person, or second possession information that is different from the first possession information and that indicates matters had by the authentication target person; and performing a determination operation of determining that authentication of the authentication target person is successful in a case where both the first authentication and the second authentication are successful, and of determining that the authentication of the authentication target person is successful in a case where both the second authentication and the third authentication are successful even when the first authentication is not successful.

At least a part of the constituent components of each of the example embodiments described above can be combined with at least another part of the constituent components of each of the example embodiments described above, as appropriate. A part of the constituent components of each of the example embodiments described above may not be used. Furthermore, to the extent permitted by law; all the references (e.g., publications) cited in this disclosure are incorporated by reference as a part of the description of this disclosure.

This disclosure is not limited to the examples described above and is allowed to be changed, if desired, without departing from the essence or spirit of this disclosure which can be read from the claims and the entire identification. An authentication apparatus, an authentication method, and a recording medium with such changes are also intended to be within the technical scope of this disclosure.

DESCRIPTION OF REFERENCE CODES

Authentication system 1, 2, 3
Authentication apparatus 1000, 10, 20, 30
User apparatus 100
First authentication unit 1011, 111
Second authentication unit 1012, 112
Third authentication unit 1013, 113
Determination unit 114
Requirement control unit 115
Acquisition unit 116
What is claimed is:

1. An authentication apparatus comprising:

at least one memory that is configured to store instructions; and at least one processor that is configured to execute the instructions to:

perform a first authentication procedure using biometric information about an authentication target person;

perform a second authentication procedure using first knowledge information indicating matters known by the authentication target person, or first possession information indicating matters had by the authentication target person;

perform a third authentication procedure using second knowledge information that is different from the first knowledge information and that indicates matters known by the authentication target person, or second possession information that is different from the first possession information and that indicates matters had by the authentication target person; and perform a determination operation of determining that authentication of the authentication target person is successful in a case where both the first authentication procedure and the second authentication procedure are successful, and of determining that the authentication of the authentication target person is successful in a case where both the second authentication procedure and the third authentication procedure are successful even when the first authentication procedure is not successful.

2. The authentication apparatus according to claim 1, wherein the at least one processor is configured to execute the instructions to: perform the second authentication procedure even when the first authentication procedure is not successful, and determine that the authentication is failed regardless of whether the second authentication procedure is successful or failed.

3. The authentication apparatus according to claim 1, the at least one processor is configured to execute the instructions to:

perform the third authentication procedure even when the second authentication procedure is not successful, and determine that the authentication is failed regardless of whether the third authentication procedure is successful or failed.

4. The authentication apparatus according to claim 1, wherein the at least one processor is configured to execute the instructions to:

determine that the authentication of the authentication target person is successful when both the first authentication procedure and the second authentication procedure are successful in a situation where a two-factor authentication function is enabled, and determines that the authentication of the authentication target person is successful even if the first authentication procedure is not successful, when both the second authentication procedure and the third authentication procedure are successful in a situation where an alternative authentication function is enabled, perform the second authentication procedure when the first authentication procedure is not successful in a situation where the two-factor authentication function is enabled and the alternative authentication function is not enabled, and determine that the authentication is failed regardless of whether the second authentication procedure is successful or is failed, and perform the third authentication procedure when the second authentication procedure is not successful in a situation where the alternative authentication function is enabled, and determine that the authentication is failed regardless of whether the third authentication procedure is successful or failed.

5. The authentication apparatus according to claim 1, wherein the at least one processor is configured to execute the instructions to:

determine that the authentication of the authentication target person is successful when both the first authentication procedure and the second authentication procedure are successful in a situation where a two-factor authentication function is enabled, and determine that the authentication of the authentication target person is successful even if the first authentication procedure is not successful, when both the second authentication procedure and the third authentication procedure are successful in a situation where an alternative authentication function is enabled, not perform the second authentication procedure when the first authentication procedure is successful in a situation where the two-factor authentication function is not enabled, or when the first authentication procedure is not successful in a situation where the alternative authentication function is not enabled, and not perform the third authentication procedure when the first authentication procedure is successful, when the first authentication procedure and the second authentication procedure are not successful, or when the alternative authentication function is not enabled.

6. The authentication apparatus according to claim 1, wherein the at least one processor is configured to execute the instructions to perform the determination operation by using results of the first to third authentication procedures, after performing the first authentication procedure, the second authentication procedure, and the third authentication procedure.

7. The authentication apparatus according to claim 1, wherein the at least one processor is configured to execute the instructions to:

perform the second authentication procedure after performing the first authentication procedure, and perform the third authentication procedure after performing the second authentication procedure.

8. The authentication apparatus according to claim 1, wherein in a case where the at least one processor is configured to execute the instructions to determine that the authentication of the authentication target person is successful, a procedure of authentication after the determination is changed in accordance with a success or a failure in each of the first authentication procedure, the second authentication procedure, and the third authentication procedure.

9. An authentication method comprising:

performing a first authentication procedure using biometric information about an authentication target person;

performing a second authentication procedure using first knowledge information indicating matters known by the authentication target person, or first possession information indicating matters had by the authentication target person;

performing a third authentication procedure using second knowledge information that is different from the first knowledge information and that indicates matters known by the authentication target person, or second possession information that is different from the first possession information and that indicates matters had by the authentication target person; and performing a determination operation of determining that authentication of the authentication target person is successful in a case where both the first authentication procedure and the second authentication procedure are successful, and of determining that the authentication of the authentication target person is successful in a case where both the second authentication procedure and the third authentication procedure are successful even when the first authentication procedure is not successful.

10. A non-transitory recording medium on which a computer program that allows a computer to execute an authentication method is recorded, the authentication method including:

performing a first authentication procedure using biometric information about an authentication target person;

performing a second authentication procedure using first knowledge information indicating matters known by the authentication target person, or first possession information indicating matters had by the authentication target person;

performing a third authentication procedure using second knowledge information that is different from the first knowledge information and that indicates matters known by the authentication target person, or second possession information that is different from the first possession information and that indicates matters had by the authentication target person; and performing a determination operation of determining that authentication of the authentication target person is successful in a case where both the first authentication procedure and the second authentication procedure are successful, and of determining that the authentication of the authentication target person is successful in a case where both the second authentication procedure and the third authentication procedure are successful even when the first authentication procedure is not successful.

* * * * *